United States Patent
Kwon et al.

(10) Patent No.: US 8,213,738 B2
(45) Date of Patent: Jul. 3, 2012

(54) METHOD FOR ELIMINATING NOISE FROM IMAGE GENERATED BY IMAGE SENSOR

(75) Inventors: Tae Hyeon Kwon, Seoul (KR); Hak Sun Kim, Daejeon (KR); Won Tae Choi, Gyunggi-Do (KR)

(73) Assignee: Samsung Electro-Mechanics Co., Ltd., Gyunggi-do (KR)

( * ) Notice: Subject to any disclaimer, the term of this patent is extended or adjusted under 35 U.S.C. 154(b) by 985 days.

(21) Appl. No.: 12/197,167

(22) Filed: Aug. 22, 2008

(65) Prior Publication Data

US 2009/0052798 A1 Feb. 26, 2009

(30) Foreign Application Priority Data

Aug. 23, 2007 (KR) ........................ 10-2007-0084797

(51) Int. Cl.
*G06K 9/40* (2006.01)
*G06K 9/48* (2006.01)
*H04N 5/00* (2011.01)
(52) U.S. Cl. ......... 382/275; 382/199; 382/274; 348/607
(58) Field of Classification Search .................. 382/199, 382/260–264, 274, 275; 348/607
See application file for complete search history.

(56) References Cited

U.S. PATENT DOCUMENTS

| | | | | |
|---|---|---|---|---|
| 5,956,432 A * | 9/1999 | Ohta | .............................. | 382/264 |
| 6,636,648 B2 * | 10/2003 | Loui et al. | ..................... | 382/284 |
| 6,718,068 B1 * | 4/2004 | Gindele et al. | ................. | 382/254 |
| 7,110,612 B1 * | 9/2006 | Wang | ............................. | 382/262 |
| 7,158,189 B2 | 1/2007 | Alvarez | | |
| 2003/0219073 A1 * | 11/2003 | Lee et al. | ................. | 375/240.27 |
| 2006/0023965 A1 * | 2/2006 | Kimbell et al. | ............... | 382/260 |
| 2007/0223835 A1 * | 9/2007 | Yamada et al. | ............... | 382/268 |
| 2008/0037627 A1 * | 2/2008 | Tang et al. | ............... | 375/240.02 |
| 2008/0152230 A1 * | 6/2008 | Forutanpour | ................. | 382/209 |
| 2008/0252789 A1 * | 10/2008 | Sawa | ............................ | 348/607 |

FOREIGN PATENT DOCUMENTS

KR  10-0485594 B1  4/2005

* cited by examiner

*Primary Examiner* — Yubin Hung
(74) *Attorney, Agent, or Firm* — Lowe, Hauptman, Ham & Berner, LLP (57) ABSTRACT

A method for eliminating noise from an image generated by an image sensor, includes: setting a group of pixels arranged in a square matrix and including a central pixel intended to eliminate the noise in the image and peripheral pixels arranged around the central pixel; obtaining absolute difference values between a luminance value of the central pixel and a luminance value of the peripheral pixels according to directionalities of the peripheral pixels about the central pixel; comparing the obtained absolute difference values with first critical values to determine a region to which the central pixel belongs; when the determined region is the contour region, eliminating noise of the group of the pixels according to directionality of the contour; and when the determined region is the noise region, eliminating the noise of the group of the pixels according to a noise level of the group of the pixels.

18 Claims, 6 Drawing Sheets

METHOD FOR ELIMINATING NOISE FROM IMAGE GENERATED BY IMAGE SENSOR

CROSS-REFERENCE TO RELATED APPLICATIONS

This application claims the priority of Korean Patent Application No. 2007-84797 filed on Aug. 23, 2007, in the Korean Intellectual Property Office, the disclosure of which is incorporated herein by reference.

BACKGROUND OF THE INVENTION

1. Field of the Invention

The present invention relates to a method for eliminating noise from an image generated by an image sensor, and more particularly, to a method for eliminating noise from an image generated by an image sensor that can remarkably enhance the picture quality of the image by segmenting a feature of the image generated by the image sensor and adaptively eliminating the noise from the image in consideration of the directionality of a contour existing in the image.

2. Description of the Related Art

In general, an image sensor is a device, which converts light detected by each of light detecting units (e.g., photodiodes) arranged in a two-dimensional matrix configuration into an electrical signal to generate an image. An electrical signal value detected by a light detecting unit and quantificated becomes a unit pixel constituting an image. Thus, each pixel of an image detected by an image sensor includes a considerable noise due to internal and external factors, such as the product quality of the image sensor or peripheral light quantity in an light detecting environment, which is a main factor deteriorating the picture quality of the image. Therefore, to improve the picture quality of the image generated by the image sensor, it is necessary to properly correct signal values generated by pixels including a noise.

To decrease a noise in an image generated by an image sensor, a variety of processing techniques have been proposed. Of such processing techniques, the simplest one is a method in which a low pass filter (LPF) is applied to the image. LPF may adjust a noise elimination level by taking a simple average value of a central pixel from which it is necessary to eliminate a noise, and peripheral pixels around the central pixel, or by using a technique obtaining a weighted average. Such a method employing the LPE has a small computational amount and shows a relatively good performance in noise elimination in a flat area of an image. However, if the LPE is applied to all the pixels constituting an image, contour information is decreased together with noise component of the image, thereby lowering the definition of the image and deteriorating the picture quality of the image.

To address the aforementioned problem, a related art noise eliminating method has been proposed, in which LPF is selectively applied only to a pixel including a noise component using a relationship between a central pixel and peripheral pixels. However, the related art method has a limitation in correctly discriminating noise and contour information. Also, since the application of LPF using all of the central pixel does not consider the direction of the contour, a problem that the contour of the image is blurred still exists.

A contour-preserving noise filtering method is the most widely used at the present time. To complement the problems in the aforementioned two methods, this method extracts directionality information of a contour using relationship between a central pixel and peripheral pixels and applies one-dimensional LPF in the direction of the contour to preserve the definition of an image and at the same time eliminate a noise. Also, this method is useful for design of hardware since it has a proper computational amount and complexity. However, the related art contour-preserving noise eliminating method effectively decreases a noise in a specific image region in which a contour exists but has a limitation in eliminating the noise in a flat region. Also, since the related art contour-preserving noise eliminating method does not consider the complexity of an input image, the illuminance of a pixel, a pattern of a noise or the like, it has a problem in that the noise is not effectively decreased.

SUMMARY OF THE INVENTION

An aspect of the present invention provides a method for eliminating a noise from an image generated by an image sensor that can more efficiently eliminate the noise in consideration of factors, such as the direction of a contour of the image, the illuminance of a pixel, an auto exposure (AE) degree, a noise pattern, etc.

According to another aspect of the present invention, there is provided a method for eliminating a noise from an image generated by an image sensor, the method includes: setting a group of pixels arranged in a square matrix and including a central pixel intended to eliminate the noise in the image inputted from the image sensor and two or more peripheral pixels arranged around the central pixel; obtaining absolute difference values between a luminance value of the central pixel and a luminance value of the peripheral pixels according to directionalities of the peripheral pixels with respect to the central pixel; comparing the obtained absolute difference values with first preset critical values, respectively to determine a region to which the central pixel belongs in the input image wherein the region comprises: a contour region in which the central pixel is included in a contour; a noise region in which the central pixel is not included in the contour and having a lot of noise; and a flat region in which the central pixel is not included in the contour, and not having the noise; when the determined region is the contour region, eliminating a noise of the group of the pixels according to directionality of the contour; and when the determined region is the noise region, eliminating the noise of the group of the pixels according to a noise level of the group of the pixels.

The obtaining of the absolute difference values may include respectively obtaining the absolute difference values in a vertical direction, a horizontal direction, a left upper direction and a right upper direction using the luminance values of the peripheral pixels arranged in the vertical direction, the horizontal direction, the left upper direction and the right upper direction centering on the central pixel in the group of the pixels.

The group of the pixels may include pixels arranged in a 5×5 square matrix centering on the central pixel, and the obtaining of the absolute difference values comprises obtaining the absolute difference values using below equation 1:

$$dv = |2 \cdot Y22 - Y02 - Y12| + |2 \cdot Y22 - Y32 - Y42|$$

$$dh = |2 \cdot Y22 - Y20 - Y21| + |2 \cdot Y22 - Y23 - Y24|$$

$$dl = |2 \cdot Y22 - Y00 - Y11| + |2 \cdot Y22 - Y33 - Y44|$$

$$dr = |2 \cdot Y22 - Y04 - Y13| + |2 \cdot Y22 - Y31 - Y40| \quad \text{Equation 1}$$

where dv is an absolute difference value in the vertical direction, dh is an absolute difference value in the horizontal direction, dl is an absolute difference value in the left upper direction, dr is an absolute difference value in the right upper direction, and Ymn is a luminance value of a pixel positioned in row m−1 and column n−1.

The determining of a region to which the central pixel belongs may include: comparing each of the absolute difference values with the first critical value; when all of the absolute difference values with the first critical value is smaller than the first critical value, determining that the region to which the central pixel belongs is the flat region; when any of the absolute difference values is greater than the first critical value, obtaining a difference value between the absolute difference value in the vertical direction and the absolute difference value in the horizontal direction, and a difference value between the absolute difference value in the left upper direction and the absolute difference value in the right upper direction, and determining the greater value of the two difference values as a representative difference value; comparing the representative difference value with a preset second critical value; when the representative difference value is greater than the second critical value, determining the region to which the central pixel belongs as the contour region; and when the representative difference value is smaller than the second critical value, determining the region to which the central pixel belongs as the noise region.

In the determining of a region to which the central pixel belongs, when it is determined that the region to which the central pixel belongs is the flat region, the noise eliminating may not be performed.

The eliminating of a noise of the group of the pixels according to directionality of the contour may include: determining the direction of a contour in which the central pixel is included, by the absolute difference value which is the greatest value of the absolute difference values in the respective directions; comparing the absolute difference value having the greatest value with a third critical value; when the absolute difference value having the greatest value is greater than the third critical value, applying one-dimensional LPF (Low Pass Filter) to the pixels arranged in the determined direction of the contour to eliminate the noise; and when the absolute difference value having the greatest value is smaller than the third critical value, determining that a noise does not exist and not performing the noise eliminating.

The eliminating of the noise of the group of the pixels according to a noise level may include: obtaining an absolute difference value between the luminance value of the central pixel and an average value of the luminance values of the peripheral pixels adjacent in the vertical direction and the horizontal direction of the central pixel to the central pixel; comparing the absolute difference value between the luminance value of the central pixel and an average value of the luminance values of the peripheral pixels adjacent in the vertical direction and the horizontal direction of the central pixel to the central pixel with a fourth preset critical value; in the comparing of the absolute difference value with the fourth critical value, when the fourth critical value is greater than the absolute difference value, applying a median filter centering on the central pixel to eliminate noise; in the comparing of the absolute difference value with the fourth critical value, when the fourth critical value is smaller than the absolute difference value, obtaining a sum of absolute difference values between the peripheral pixels adjacent in a diagonal direction of the central pixel to the central pixel; and comparing the sum of absolute difference values between the peripheral pixels adjacent in a diagonal direction with fifth critical values that are different from each other and preset, selecting one of two or more two-dimensional LPFs having coefficients differentially determined according to the sizes of the fifth critical values, according to a comparing result between the sum and the fifth critical values, and applying the selected two-dimensional LPF to the group of the pixels to eliminate noise.

The first to fourth critical values may be adjusted such that as the average value of the luminance values of the pixels included in the group of the pixels increases, a noise eliminating level increases. Also, the first to fourth critical values may be adjusted such that as an illuminance environment obtained by an auto exposure in photographing the image goes to a low illuminance environment, a noise eliminating level increases.

Similarly to this, the coefficient of the one-dimensional LPF and the coefficients of the two-dimensional LPFs may be adjusted such that as the average value of the luminance values of the pixels included in the group of the pixels increases, a noise eliminating level increases or such that as an illuminance environment obtained by an auto exposure in photographing the image goes to a low illuminance environment, a noise eliminating level increases.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings. The exemplary embodiments may, however, be embodied in many different forms and should not be construed as being limited to the embodiments set forth herein; rather, these embodiments are provided so that this disclosure will be thorough and complete, and will fully convey the concept of the invention to those skilled in the art. Accordingly, it will be appreciated that the shapes and sizes of elements shown in the drawings may be exaggerated for clarity.

Figure 1:
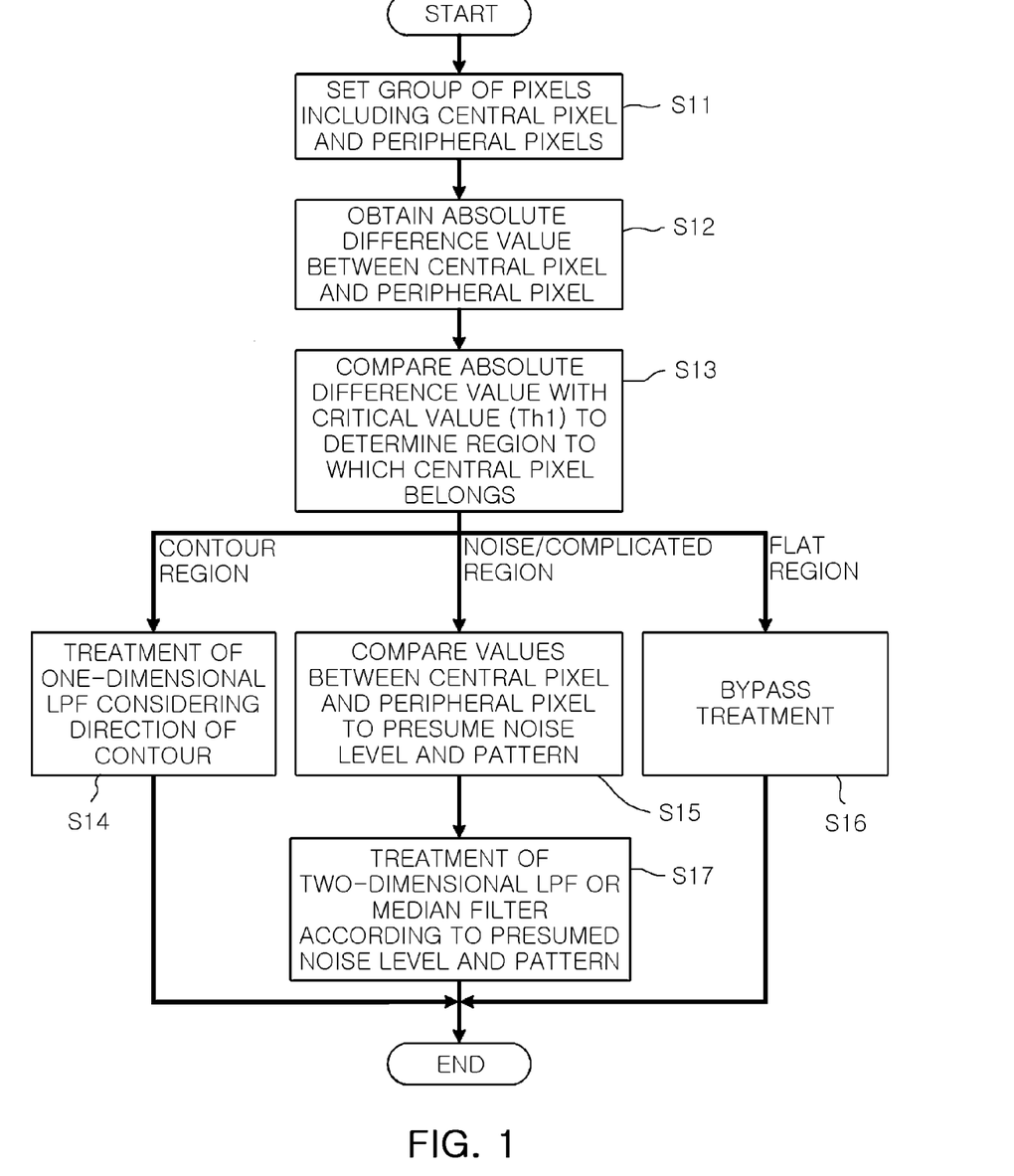
FIG. 1 is a flowchart illustrating a method for eliminating a noise from an image generated by an image sensor according to an embodiment of the present invention.

FIG. 1 is a flowchart illustrating a method for eliminating a noise from an image generated by an image sensor according to an embodiment of the present invention.

Referring to FIG. 1, the method for eliminating a noise from an image generated by an image sensor according to an embodiment of the present invention may include: an operation S11 of setting a group of pixels including a central pixel and peripheral pixels; an operation S12 of obtaining absolute difference values between a luminance value of the central pixel and a luminance value of the peripheral pixels; an operation S13 of comparing the obtained absolute difference values with preset critical values, respectively to determine a region to which the central pixel belongs in the input image; when the determined region is a contour region, an operation S14 of eliminating a noise of the group of the pixels according to directionality of the contour; and when the determined region is a noise region, an operation S15 of eliminating the noise of the group of the pixels according to a noise level of the group of the pixels.

The operation S11 is an operation of setting a group of pixels arranged in a square matrix and including a central pixel intended to eliminate the noise in the image inputted from the image sensor and two or more peripheral pixels arranged around the central pixel. The image inputted from the image sensor may be an image of which pixels are expressed as a luminance value (Y) and a chroma value (CbCr) by performing a pretreatment process such as a color interpolation with an image signal inputted from the image sensor. In the operation S11, all of the respective pixels contained in the image inputted from the image sensor may be targets to eliminate a noise, and the group of pixels arranged in a square matrix and including the central pixel intended to eliminate a noise at a center and the peripheral pixels disposed around the central pixel is defined. That is, the noise elimination for the input image is performed in a pixel unit, and the group of the pixels arranged in a square matrix is defined to perform the noise elimination with respect to one pixel. The central pixel intended to eliminate a noise is disposed at the center of the group of the pixels, and the remaining pixels of the group of the pixels may become the peripheral pixels. An example of the group of the pixels is shown in FIG. 2.

Figure 2:
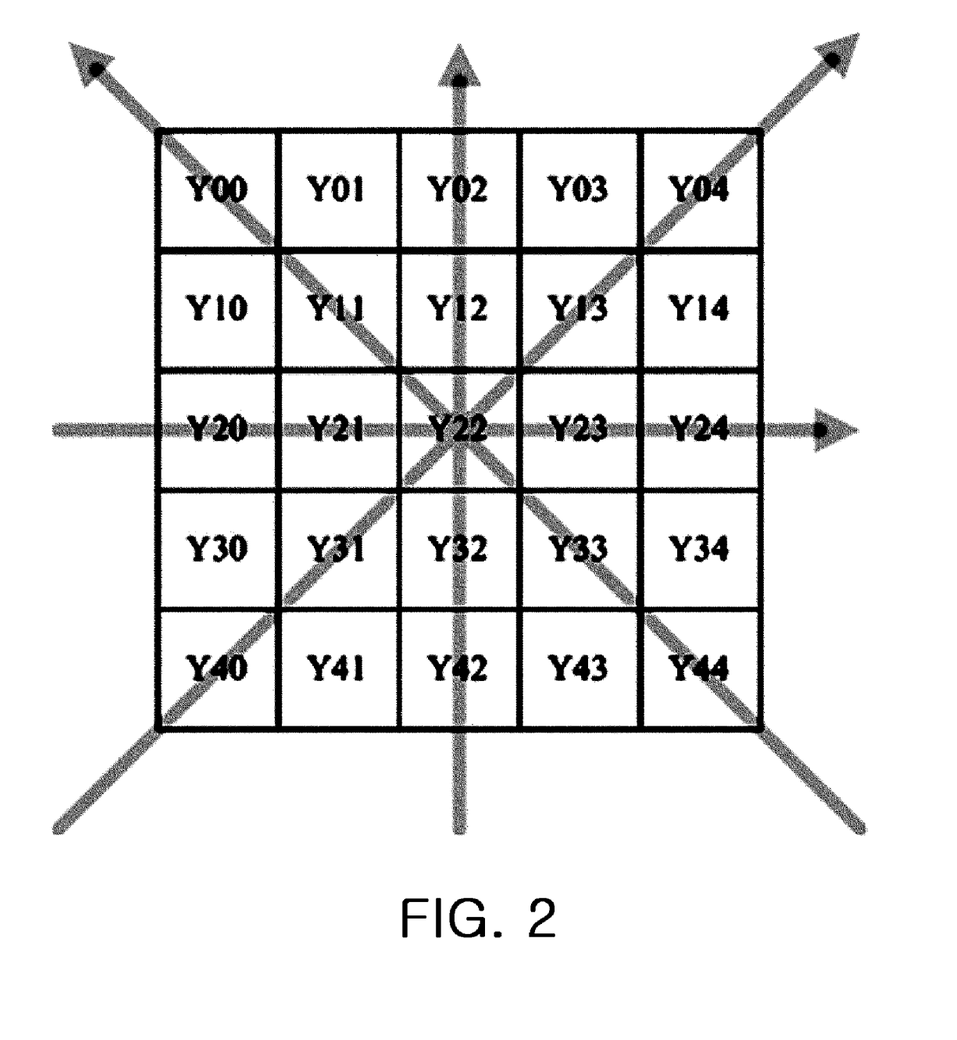
FIG. 2 is an example of a group of pixels applied to a noise eliminating method according to an embodiment of the present invention and shows a group of pixels in which a central pixel and peripheral pixels are arranged in a 5×5 square matrix configuration.

FIG. 2 is an example of a group of pixels applied to a noise eliminating method according to an embodiment of the present invention and shows a group of pixels in which a central pixel and peripheral pixels are arranged in a 5×5 square matrix configuration. In FIG. 2, a pixel Y22 positioned at a center of the 5×5 square matrix becomes the central pixel, and the remaining pixels become the peripheral pixels. Arrows in FIG. 2 represent directionalities of pixels about the central pixel considered in the noise eliminating method according to an embodiment of the present invention. In the configuration of FIG. 2, the arrow in the row direction represents a horizontal direction, the arrow in the column direction represents a vertical direction, the arrow in the direction from the right, lower corner to the left upper corner represents a left upper direction, and the arrow in the direction from the left, lower corner to the right upper corner represents a right upper direction.

The present embodiment will be described below with the example of the group of the pixels shown in FIG. 2. It will be understood that the present invention is not limited to the example of the group of the pixels shown in FIG. 2.

After the above operation S11 is completed, absolute difference values between a luminance value of the central pixel and a luminance value of the peripheral pixels are obtained according to directionalities of the peripheral pixels with respect to the central pixel. That is, in the present operation S21, the absolute difference values are obtained using the luminance value of the central pixel Y22 and the luminance values of the peripheral pixels arranged in the vertical direction, horizontal direction, left upper direction and right upper direction about the central pixel Y22. The absolute difference values between the luminance value of the central pixel Y22 and the luminance values of the peripheral pixels obtained from the example of the group of the pixels of FIG. 2 are expressed by below equation 1.

$$dv = |2 \cdot Y22 - Y02 - Y12| + |2 \cdot Y22 - Y32 - Y42|$$

$$dh = |2 \cdot Y22 - Y20 - Y21| + |2 \cdot Y22 - Y23 - Y24|$$

$$dl = |2 \cdot Y22 - Y00 - Y11| + |2 \cdot Y22 - Y33 - Y44|$$

$$dr = |2 \cdot Y22 - Y04 - Y13| + |2 \cdot Y22 - Y31 - Y40| \qquad \text{Equation 1}$$

In the above equation 1, dv represents an absolute difference value in the vertical direction, dh represents an absolute difference value in the horizontal direction, dl represents an absolute difference value in the left upper direction, and dr represents an absolute difference value in the right upper direction, respectively. These absolute difference values show differences in luminance value between the central pixel and the peripheral pixels according to the directionality. By doing so, it can be determined whether the central pixel is included in the contour of the input image. For example, in the case of considering not a noise component at all, if the absolute difference value dh in the vertical direction is larger than a preset critical value, it can be determined that the central pixel Y22 has a remarkably larger or smaller luminance value than the peripheral pixels arranged in the vertical direction, and accordingly, it may be presumed that a contour may exist in the horizontal direction. Also, by using a difference relationship between the luminance value of the central pixel and the luminance value of the peripheral pixels according to the directionality, it can be determined whether a contour exists in the group of the pixels or the group of the pixels is a complicated image influenced by a noise or the like. This determination may be performed in an operation S13.

The operation S13 is an operation of determining whether the central pixel is included in any state of an image region using the absolute difference values dv, dh, dl, dr and their relationships. In the present invention, the image region to which the central pixel belongs may be classified into a contour region in which the central pixel is included in a contour; a noise region in which the central pixel is not included in the contour and having a lot of noise; and a flat region in which the central pixel is not included in the contour, and not having the noise. Detailed flow of the operation S13 is shown in FIG. 3.

Figure 3:
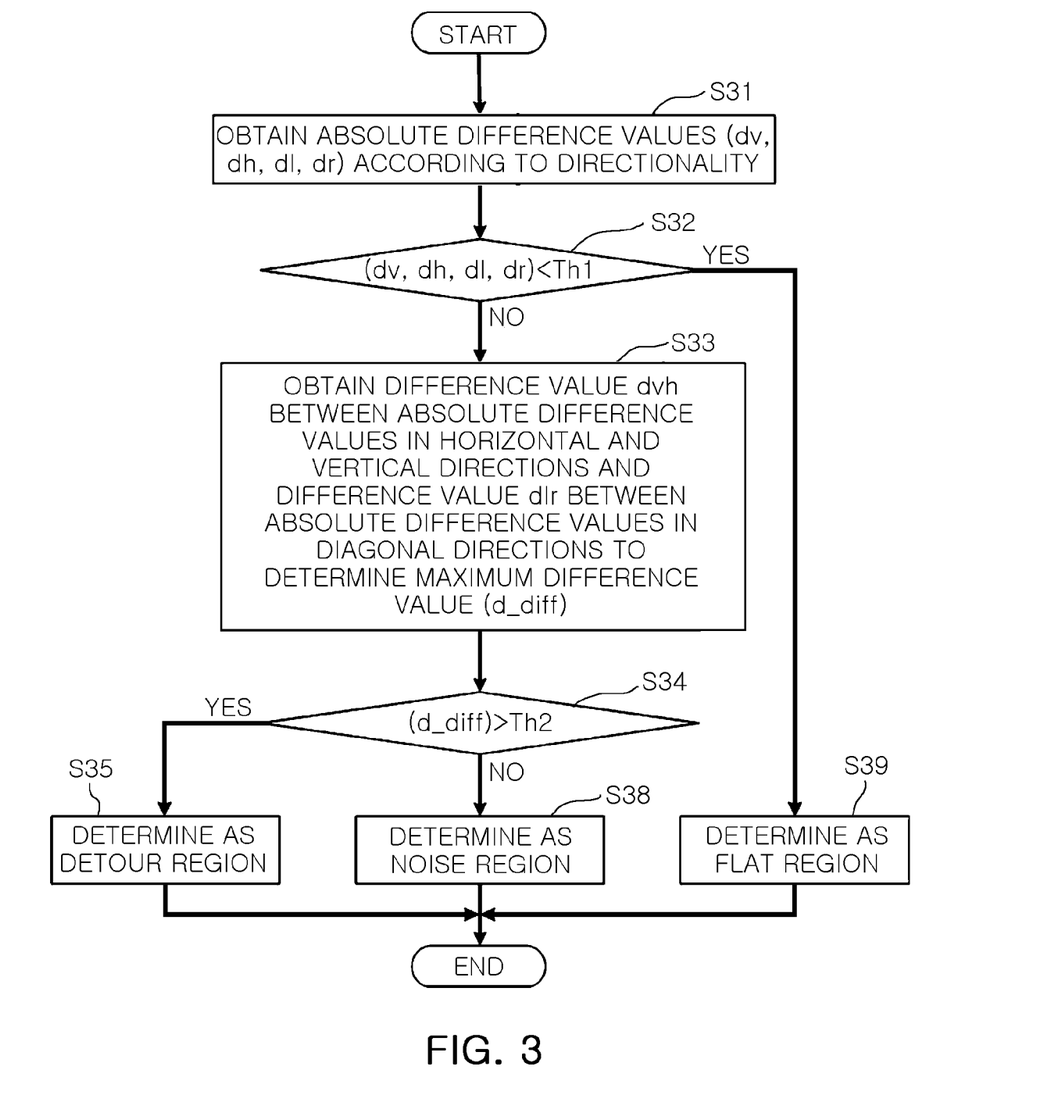
FIG. 3 is a detailed flowchart illustrating an operation of determining a region to which a central pixel belongs.

Referring to FIG. 3, if the absolute difference values dv, dh, dl, dr between the luminance value of the central pixel Y22 and the luminance value of the peripheral pixels according to the directionality are obtained in a preceding operation S31, each of the absolute difference values is compared with a predetermined critical value Th1 in operation S32. The preceding operation S31 is substantially the same as the operation S12 of FIG. 1.

In operation 39, when the absolute difference values dv, dh, dl, dr are all smaller than the critical value Th1, it is determined that the central pixel Y22 belongs to the flat region in which the central pixel is not included in the contour and not having a noise. Accordingly, a noise elimination is not performed and the flow is bypassed (S16 of FIG. 1).

Meanwhile, in operation S33, when at least one of the absolute difference values dv, dh, dl, dr is larger than the critical value Th1, a difference value dvh between the absolute difference value dv in the vertical direction and the absolute difference value dh in the horizontal direction, and a difference value dlr between the absolute difference value dv in the left upper direction and the absolute difference value dh in the right upper direction are obtained, and the greater of the difference value dvh and the difference value dlr is determined as a representative difference value d_diff. In this operation S33, the representative difference value d_diff may be expressed by below equations 2 and 3.

$$dvh=|dv-dh|$$

$$dlr=|dl-dr| \quad \text{Equation 2}$$

$$d\_diff=MAX\{dvh,dlr\} \quad \text{Equation 3}$$

In the equation 3, the operator 'MAX' means that the greater of two values in the parenthesis is selected. In operation 34, the representative difference value d_diff, which is the greater of the difference value dvh between the absolute difference value dv in the vertical direction and the absolute difference value dh in the horizontal direction, and the difference value dlr between the absolute difference value dv in the left upper direction and the absolute difference value dh in the right upper direction, is compared with another preset critical value, and according to the comparing result, it is determined whether the region in which the central pixel is included is the contour region or the noise region in operations S35 and S36. Although the absolute difference values dv, dh, dl, dr in the respective directions are large, a small difference between the absolute difference values in each contour direction means that a probability that the central pixel is a noise no having the directionality or is included in a very complicated image is high. On the contrary, if the absolute difference values dv, dh, dl, dr in the respective directions are large and differences between the absolute difference values in the respective contour directions are also large, a probability that the central pixel is included in the contour region is high. In consideration of these circumstances, in operation S34, when the representative difference value d_diff is smaller than the preset critical value Th2, it is determined that the central pixel is included in the noise region (S38), and in operation S34, when the representative difference value d_diff is greater than the preset critical value Th2, it is determined that the central pixel is included in the contour region (S35).

Thus, if a region in which the central pixel in the group of the pixels is included is determined, a noise eliminating process suitable for the determined region is performed.

Figure 4:
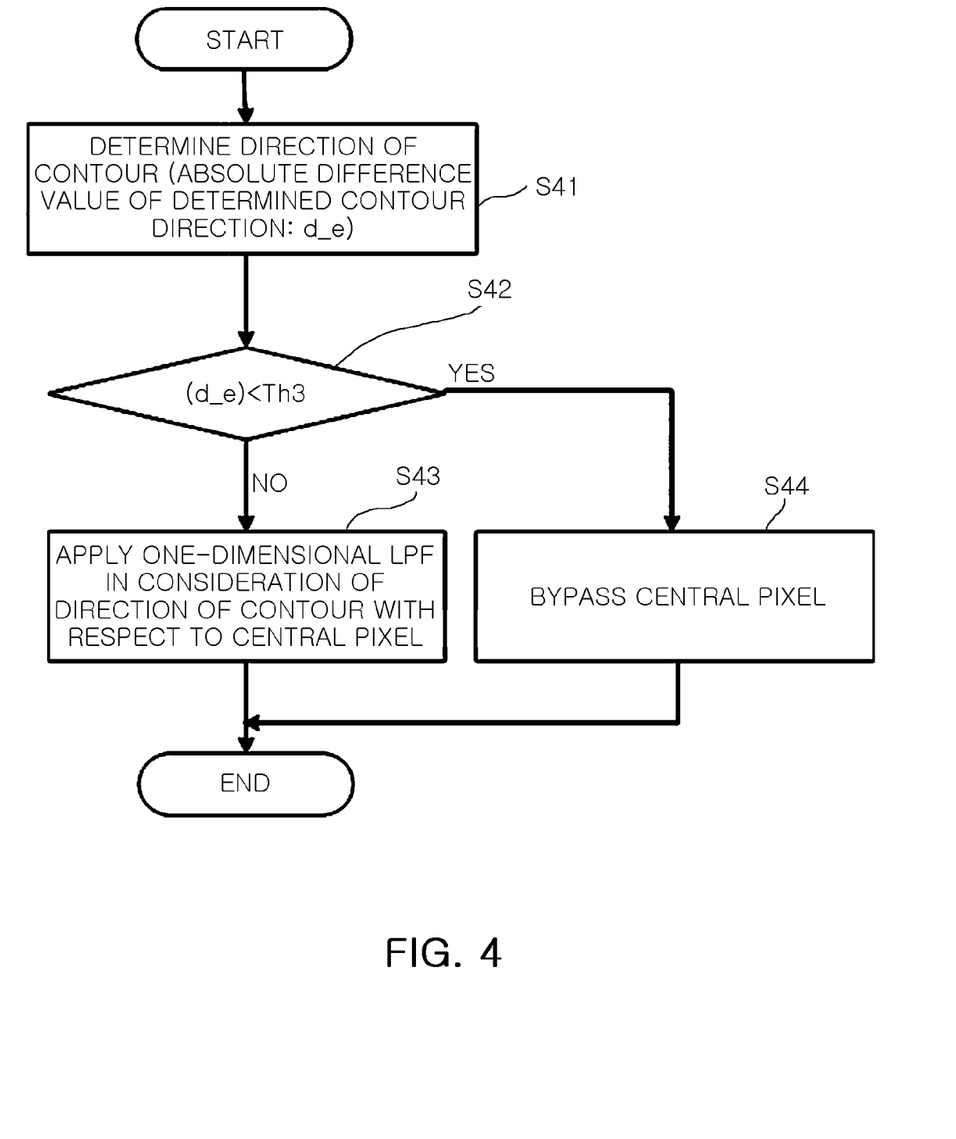
FIG. 4 is a detailed flowchart illustrating a noise eliminating operation performed when it is determined that a region in which a central pixel is included is a contour region in a noise eliminating method according to an embodiment of the present invention.

In operation S35 of FIG. 3, when it is determined that the region in which the central pixel is included is the contour region, a noise eliminating process is performed, which will be described in more detail with reference to FIG. 4. Referring to FIG. 4, by comparing the absolute difference values dv, dh, dl, dr in the respective directions obtained in operation S12, the direction of the contour in which the central pixel is included is determined in operation S41. The operation S41 may be an operation of selecting the greatest of the absolute difference values dv, dh, dl, dr obtained in the aforementioned operation S12 as expressed by below equation 4.

$$d\_e=MAX\{dv,dh,dl,dr\} \quad \text{Equation 4}$$

For example, when the absolute difference value dv in the vertical direction is selected as the greatest value by equation 4, it may be determined that the central pixel is included in the contour in the horizontal direction showing a large difference in the luminance value between the central pixel and the peripheral pixels in the vertical direction. Likewise, when the absolute difference value dh in the horizontal direction is selected as the greatest value by equation 4, it may be determined that the central pixel is included in the contour in the vertical direction showing a large difference in the luminance value between the central pixel and the peripheral pixels in the horizontal direction. When the absolute difference value dl in the left upper direction is selected as the greatest value by equation 4, it may be determined that the central pixel is included in the contour in the right upper direction showing a large difference in the luminance value between the central pixel and the peripheral pixels in the left upper direction. When the absolute difference value dr in the right upper direction is selected as the greatest value by equation 4, it may be determined that the central pixel is included in the contour in the left upper direction showing a large difference in the luminance value between the central pixel and the peripheral pixels in the right upper direction. The absolute difference value, which is selected as the greatest value by equation 4 is represented as 'd_e'.

After the direction of the contour is determined in operation S41, the absolute difference value d_e selected in operation S41 is compared with another preset critical value Th3 in order to determine whether the determined contour includes a noise. This critical value Th3 is a value predetermined for determining whether the contour includes a noise therein. When the absolute difference valued_e selected in operation s41 is greater than the critical value Th3, it is determined that the difference in luminance value is large ideally and a noise exists. When the absolute difference value d_e is smaller than the critical value Th3, it is determined that a noise does not exist.

When it is determined that a noise does not exist, a separate noise eliminating process is not performed and an image processing for a corresponding central pixel may be bypassed in operation S44.

When it is determined that a noise exists, one-dimensional low pass filtering is performed using the peripheral pixels and the central pixel existing in the direction of the contour determined in operation S41, thereby eliminating the noise of the central pixel while preserving the contour. In the example of the group of the pixels shown in FIG. 2, when it is determined that the absolute difference value dh in the horizontal direction is selected as the greatest absolute difference value d_e in operation S41 and a contour in the vertical direction exists, in operation 42, one-dimensional LPF may be applied using pixels existing in the vertical direction about the central pixel as shown in Equation 5.

$$\text{new\_}Y22=a\cdot Y02+b\cdot Y12+c\cdot Y22+d\cdot Y32+e\cdot Y42 \text{ (where } a+b+c+d+e=1) \quad \text{Equation 5}$$

In Equation 5, all weighted coefficients satisfying characteristics of LPF may be applied to coefficients a, b, c, d and e, and the coefficients a, b, c, d, and e may be properly determined in consideration of a noise decrease level, the complexity in design of hardware, etc.

Figure 5:
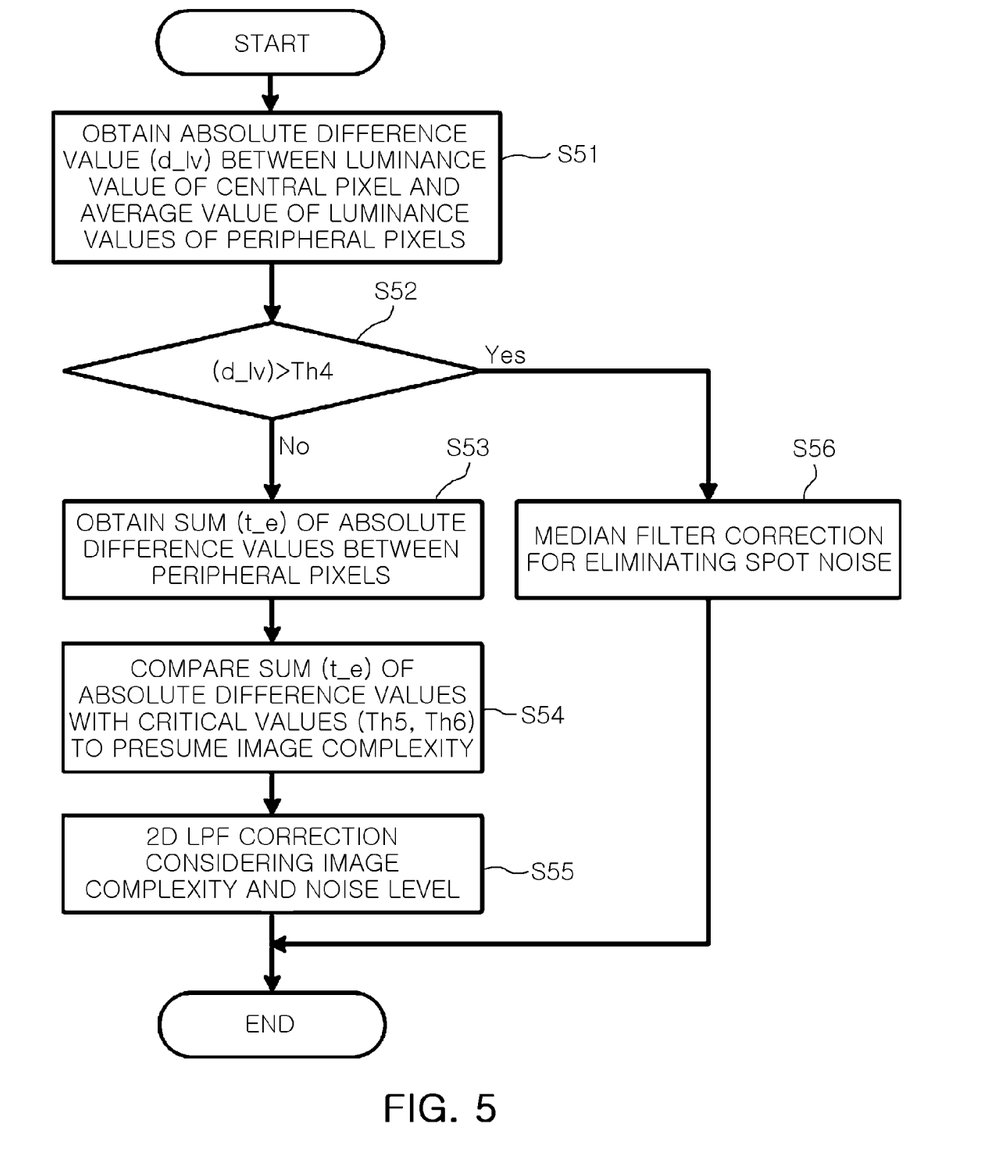
FIG. 5 is a detailed flowchart illustrating a noise eliminating operation performed when it is determined that a central pixel is included in a noise region in a noise eliminating method according to an embodiment of the present invention.

Meanwhile, when it is determined that the central pixel is included in the noise region in operation S38, a noise eliminating process is performed, which will be described in more detail with reference to FIG. 5. Referring to FIG. 5, in operation S51, an absolute difference value between a luminance value of the central pixel and an average value of luminance values of pixels adjacent in the vertical direction and horizontal direction to the central pixel is obtained. This operation S51 is an operation of determining whether the central pixel has a spot noise (or called impulse noise) having a much higher luminance value than pixels adjacent to the central pixel. With reference to the example of the group of the pixels shown in FIG. 2, the operation S51 may be performed by below equation 6.

$$d\_lv = \left| Y22 - \frac{Y12 + Y21 + Y23 + Y32}{4} \right|$$ Equation 6

As seen from Equation 6, the operation S51 is an operation of obtaining an absolute difference value d_lv between the luminance value of the central pixel and an average value of luminance values of the pixels Y12, Y32 adjacent in the vertical direction to the central pixel and the pixels Y21, Y23 adjacent in the horizontal direction to the central pixel.

Next, in operation S52, the absolute difference value d_lv obtained in the operation S51 is compared with another critical value Th4. The critical value Th4 is a reference value to determine whether the central pixel Y22 has a much higher luminance value than the peripheral pixels, i.e., the central pixel Y22 has a spot noise. The critical value may be determined in advance.

As a result of the comparing operation S52, when the absolute difference value obtained in the operation S51 is greater than the critical value, it is determined that the central pixel has a much higher luminance value than the peripheral pixels, i.e., the central pixel Y22 has a spot noise. Accordingly, in operation S56, a process for eliminating the spot noise from the central pixel is performed using a median filter. It is difficult to completely eliminate the spot noise using a typical LPF. To effectively eliminate the spot noise, a median filter having a 3×3 mask centering on the central pixel is used.

As a result of the comparing operation S52, when the absolute difference value d_lv obtained in the operation S51 is smaller than the critical value Th4, it is determined that the spot noise does not exist, and a sum of absolute difference values between the peripheral pixels adjacent in a diagonal direction of the central pixel to the central pixel is obtained in operation S53.

With reference to the example of the group of the pixels shown in FIG. 2, the operation S53 may be performed by below equation 7.

$$t\_e = |Y11-Y13|+|Y31-Y33|+|Y11-Y31|+|Y11-Y33|$$ Equation 7

Next, in operation S53, a sum t_e of absolute difference values between the peripheral pixels adjacent in a diagonal direction of the central pixel to the central pixel is obtained. After that, in operation S54, the sum t_e is compared with arbitrary critical values Th5, Th6 to presume a noise level of the image in the group of the pixels. In general, the complexity level of an image is proportional to the sum t_e of the absolute difference values. That is, the higher the sum t_e of the absolute difference values is, the higher the complexity of the image is, and as the complexity of a peripheral image formed by the peripheral pixels increases, it is determined that a noise level in the central pixel decreases. Therefore, by applying a two-dimensional LPF having a difference in weighted value according to a noise level of the central pixel, it is possible to effectively decrease the noise without lowering the definition of the image. In this operation S54, two or more critical values capable of determining the complexity (or noise level) of the image may be determined in advance such that two-dimensional LPF having different intensities can be applied to regions divided by these critical values. For example, in the operation S54, two critical values (i.e., Th5 and Th6 (Th5<Th6)) may be determined in advance, and two-dimensional LPFs having different intensities may be determined in advance with respect to regions determined by these critical values, i.e., a region having a value smaller than the critical value Th5, a second having a value between the critical value Th5 and the critical value Th6, and a second having a value greater than the critical value Th6. As a more concrete example, when the region in which the sum t_e of the absolute difference values is smaller than the critical value Th5 is determined to be an image including a noise, a two-dimensional LPF having a weak intensity may be applied, and when a region in which the sum t_e of the absolute difference values is greater than the critical value Th6 is determined to be a complicated image, a two-dimensional LPF having a strong intensity may be applied. In the region between the two critical values Th5 and Th6, a two-dimensional LPF having an intensity that is greater than that of the LPF applied to the region having a smaller value than the critical value Th5 and that is less than that of the LPF applied to the region having a greater value than the critical value Th6 may be applied. Thus, the present invention differently applies the two-dimensional LPFs determined with respect to the regions divided by the critical values Th5 and Th6 according to the regions to which the sum t_e of the absolute difference values belongs, thereby performing a noise decrease differentially according to the noise level.

Meanwhile, the noise eliminating method according to an embodiment of the present invention can change the critical value determining the noise level in consideration of the luminance of the group of the pixels and the illuminance in photographing an image, and the coefficient of the LPF decreasing the noise. In general, human eyesight recognizing a noise has a different according to the illuminance of an image. In particular, in a region where an image is very dark or light, a noise is apparently shown to human eyesight. Accordingly, by adjusting the critical value for determining the aforementioned contour and the noise level according to the illuminance of an image, it is possible to more effectively decrease the noise. For this purpose, an embodiment of the present invention may employ a method of a critical value and a coefficient value of an LPF in consideration of the illuminance of a group of pixels and illuminance in photographing an image as shown in FIG. 6.

Figure 6:
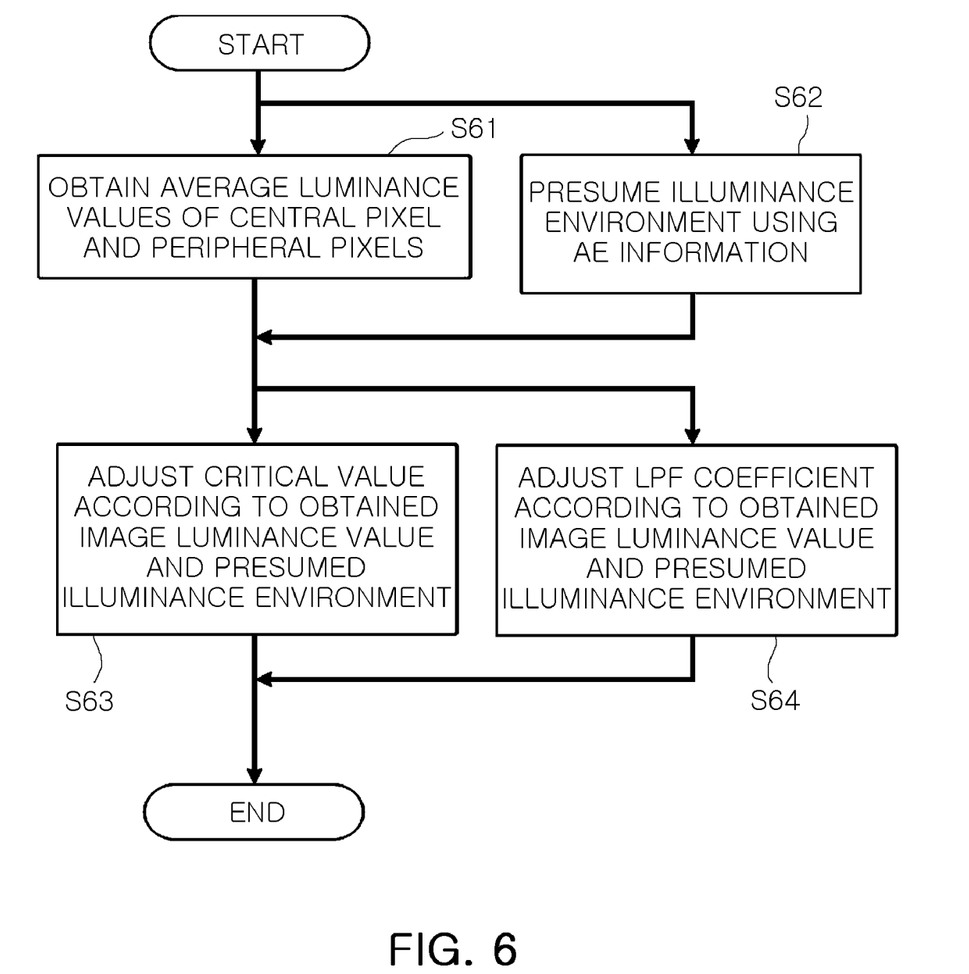
FIG. 6 is a flowchart illustrating a method of controlling a critical value obtained in consideration of the illuminance of a group of pixels and an illuminance in photographing an image, and a coefficient value of an LPF in a noise eliminating method according to an embodiment of the present invention.

Referring to FIG. 6, in operation S61, an average luminance of the central pixel and the peripheral pixels in the group of the pixels is obtained. For example, in the case where the group of the pixels shown in FIG. 2 is set, the average luminance lv of the central pixel and the peripheral pixels in the group of the pixels may be obtained by below equation 8.

$$lv = \frac{Y22}{4} + \frac{Y12+Y21+Y23+Y32}{8} + \frac{Y11+Y13+Y31+Y33}{16}$$ Equation 8

In the above equation 8, the average luminance lv is obtained using luminance values of pixels adjacent in vertical direction, horizontal direction and diagonal direction to the central pixel of the central pixel and the peripheral pixels.

In operation S62, an illuminance environment may be presumed using auto exposure information in photographing an image while performing the operation S61. In general, in the case of a low illuminance environment, it is known that the picture quality of an image is low and the image includes much noise. Accordingly, as it goes to a low illuminance environment, it is necessary to eliminate a noise at a stronger level. In general, the auto exposure information reflects an illuminance environment under which an image is photographed by an image sensor. Therefore, it is possible to discriminate whether the illuminance environment in photographing an image is a general illuminance environment or a low illuminance environment through this auto exposure information.

Next, the sizes of the critical values used for discriminating the aforementioned contour and the noise level may be adjusted in consideration of the average luminance value lv obtained in the operation S61 and the illuminance environment obtained in the operation S62. For example, in the case where the average luminance value lv is more or less than a predetermined level, since the noise can be more easily discriminated by human eyes, the sizes of the critical values may be adjusted such that a stronger noise elimination can be performed. Similarly to this, when it is determined to be a low illuminance environment, more noise is generated. Accordingly, the sizes of the critical values can be adjusted such that a stronger noise elimination can be performed.

Also, the coefficient of the LPF may be adjusted in consideration of the average luminance value lv obtained in the operation S61 and the illuminance environment obtained in the operation S62. Like in the case of adjusting the critical values, when it is determined that the average luminance value lv is more or less than a predetermined level or the environment has a low illuminance, the coefficient of the LPF can be adjusted such that a stronger noise elimination can be performed.

According to embodiments of the present invention, it is possible to adaptively adjust the noise eliminating level according to the luminance of an image and the illuminance environment in photographing the image.

According to the present invention, the picture quality of an image can be remarkably enhanced by segmenting a feature of the image generated by the image sensor and adaptively eliminating the noise from the image in consideration of the directionality of a contour existing in the image.

Also, a noise eliminating efficiency can be further enhanced by adjusting the noise eliminating level in consideration of the illuminance of an image and an illuminance environment in photographing an image.

While the present invention has been shown and described in connection with the exemplary embodiments, it will be apparent to those skilled in the art that modifications and variations can be made without departing from the spirit and scope of the invention as defined by the appended claims.

What is claimed is:

1. A method for eliminating a noise from an image generated by an image sensor, the method comprising:
    setting a group of pixels arranged in a square matrix and including a central pixel intended to eliminate the noise in the image inputted from the image sensor and two or more peripheral pixels arranged around the central pixel;
    obtaining absolute difference values between a luminance value of the central pixel and a luminance value of the peripheral pixels according to directionalities of the peripheral pixels with respect to the central pixel;
    comparing each of the obtained absolute difference values with a first preset critical value to determine a region to which the central pixel belongs in the input image, wherein the region is one of: a contour region in which the central pixel is included in a contour; a noise region in which the central pixel is not included in the contour and having a lot of noise; and a flat region in which the central pixel is not included in the contour, and not having the noise;
    when the determined region is the contour region, eliminating a noise of the group of the pixels according to directionality of the contour; and
    when the determined region is the noise region, eliminating the noise of the group of the pixels according to a noise level of the group of the pixels;
    wherein the determination of the region to which the central pixel belongs comprises:
    when all of the absolute difference values are smaller than the first critical value, determining that the region to which the central pixel belongs is the flat region;
    when any of the absolute difference values is greater than the first critical value,
        obtaining a first difference value between the absolute difference value in a vertical direction and the absolute difference value in a horizontal direction, and a second difference value between the absolute difference value in a left upper direction and the absolute difference value in a right upper direction,
        determining the greater value of the first and second difference values as a representative difference value;
        comparing the representative difference value with a preset second critical value;
        when the representative difference value is greater than the second critical value, determining the region to which the central pixel belongs as the contour region; and
        when the representative difference value is smaller than the second critical value, determining the region to which the central pixel belongs as the noise region.

2. The method of claim 1, wherein the obtaining of the absolute difference values comprises respectively obtaining the absolute difference values in the vertical direction, the horizontal direction, the left upper direction and the right upper direction using the luminance values of the peripheral pixels arranged in the vertical direction, the horizontal direction, the left upper direction and the right upper direction centering on the central pixel in the group of the pixels.

3. The method of claim 2, wherein the group of the pixels comprises pixels arranged in a 5×5 square matrix centering on the central pixel, and
    the obtaining of the absolute difference values comprises obtaining the absolute difference values using below equation 1:

$$dv=|2 \cdot Y22-Y02-Y12|+|2 \cdot Y22-Y32-Y42|$$

$$dh=|2 \cdot Y22-Y20-Y21|+|2 \cdot Y22-Y23-Y24|$$

$$dl=|2 \cdot Y22-Y00-Y11|+|2 \cdot Y22-Y33-Y44|$$

$$dr=|2 \cdot Y22-Y04-Y13|+|2 \cdot Y22-Y31-Y40| \qquad \text{Equation 1}$$

where dv is the absolute difference value in the vertical direction, dh is the absolute difference value in the horizontal direction, dl is the absolute difference value in the left upper direction, dr is the absolute difference value in the right upper direction, and Ymn is a luminance value of a pixel positioned in row m-1 and column n-1.

4. The method of claim 1, wherein when it is determined that the region to which the central pixel belongs is the flat region, the noise eliminating is not performed.

5. The method of claim 2, wherein the eliminating of a noise of the group of the pixels according to directionality of the contour comprises:
    determining the direction of a contour in which the central pixel is included, by the absolute difference value which is the greatest value of the absolute difference values in the respective directions;

comparing the absolute difference value having the greatest value with a third critical value;
when the absolute difference value having the greatest value is greater than the third critical value, applying one-dimensional LPF (Low Pass Filter) to the pixels arranged in the determined direction of the contour to eliminate the noise; and
when the absolute difference value having the greatest value is smaller than the third critical value, determining that a noise does not exist and not performing the noise eliminating.

6. The method of claim 2, wherein the eliminating of the noise of the group of the pixels according to a noise level comprises:
obtaining an absolute difference value between the luminance value of the central pixel and an average value of the luminance values of the peripheral pixels adjacent in the vertical direction and the horizontal direction of the central pixel to the central pixel;
comparing the absolute difference value between the luminance value of the central pixel and an average value of the luminance values of the peripheral pixels adjacent in the vertical direction and the horizontal direction of the central pixel to the central pixel with a fourth preset critical value;
in the comparing of the absolute difference value with the fourth critical value, when the fourth critical value is greater than the absolute difference value, applying a median filter centering on the central pixel to eliminate noise;
in the comparing of the absolute difference value with the fourth critical value, when the fourth critical value is smaller than the absolute difference value, obtaining a sum of absolute difference values between the peripheral pixels adjacent in a diagonal direction of the central pixel to the central pixel; and
comparing the sum of absolute difference values between the peripheral pixels adjacent in a diagonal direction with fifth critical values that are different from each other and preset, selecting one of two or more two-dimensional LPFs having coefficients differentially determined according to the sizes of the fifth critical values, according to a comparing result between the sum and the fifth critical values, and applying the selected two-dimensional LPF to the group of the pixels to eliminate noise.

7. The method of claim 1, wherein the first critical value is adjusted such that as the average value of the luminance values of the pixels included in the group of the pixels increases, a noise eliminating level increases.

8. The method of claim 1, wherein the first critical value is adjusted such that as an illuminance environment obtained by an auto exposure in photographing the image goes to a low illuminance environment, a noise eliminating level increases.

9. The method of claim 1, wherein the second critical value is adjusted such that as the average value of the luminance values of the pixels included in the group of the pixels increases, a noise eliminating level increases.

10. The method of claim 1, wherein the second critical value is adjusted such that as an illuminance environment obtained by an auto exposure in photographing the image goes to a low illuminance environment, a noise eliminating level increases.

11. The method of claim 5, wherein the third critical value is adjusted such that as the average value of the luminance values of the pixels included in the group of the pixels increases, a noise eliminating level increases.

12. The method of claim 5, wherein the third critical value is adjusted such that as an illuminance environment obtained by an auto exposure in photographing the image goes to a low illuminance environment, a noise eliminating level increases.

13. The method of claim 6, wherein the fourth critical value is adjusted such that as the average value of the luminance values of the pixels included in the group of the pixels increases, a noise eliminating level increases.

14. The method of claim 6, wherein the fourth critical value is adjusted such that as an illuminance environment obtained by an auto exposure in photographing the image goes to a low illuminance environment, a noise eliminating level increases.

15. The method of claim 5, wherein the coefficient of the one-dimensional LPF is adjusted such that as the average value of the luminance values of the pixels included in the group of the pixels increases, a noise eliminating level increases.

16. The method of claim 5, wherein the coefficient of the one-dimensional LPF is adjusted such that as an illuminance environment obtained by an auto exposure in photographing the image goes to a low illuminance environment, a noise eliminating level increases.

17. The method of claim 6, wherein the coefficients of the two-dimensional LPFs are adjusted such that as the average value of the luminance values of the pixels included in the group of the pixels increases, a noise eliminating level increases.

18. The method of claim 6, wherein the coefficients of the two-dimensional LPFs are adjusted such that as an illuminance environment obtained by an auto exposure in photographing the image goes to a low illuminance environment, a noise eliminating level increases.

* * * * *